United States Patent
Gimpel et al.

(10) Patent No.: US 11,914,074 B2
(45) Date of Patent: Feb. 27, 2024

(54) OPTOELECTRONIC SENSOR AND METHOD FOR THE DETECTION OF OBJECTS

(71) Applicant: SICK AG, Waldkirch (DE)

(72) Inventors: Hartmut Gimpel, Waldkirch (DE); Gottfried Hug, Waldkirch (DE); Klaus Clemens, Waldkirch (DE)

(73) Assignee: SICK AG, Waldkirch (DE)

( * ) Notice: Subject to any disclaimer, the term of this patent is extended or adjusted under 35 U.S.C. 154(b) by 1040 days.

(21) Appl. No.: 16/256,238

(22) Filed: Jan. 24, 2019

(65) Prior Publication Data

US 2019/0235058 A1 Aug. 1, 2019

(30) Foreign Application Priority Data

Jan. 26, 2018 (DE) .......................... 102018101846.0

(51) Int. Cl.
*G01S 7/481* (2006.01)
*G01S 17/42* (2006.01)

(52) U.S. Cl.
CPC ........... *G01S 7/4817* (2013.01); *G01S 7/4811* (2013.01); *G01S 7/4815* (2013.01); *G01S 17/42* (2013.01)

(58) Field of Classification Search
CPC .... G01S 7/4817; G01S 7/4811; G01S 7/4815; G01S 17/42; G01S 7/48–51; G01S 7/4812; G01S 7/4813; G01S 7/4814; G01S 7/4816; G01S 7/481; G01C 3/08; G01C 3/02; G01C 3/06; G01C 11/00
See application file for complete search history.

(56) References Cited

U.S. PATENT DOCUMENTS

| | | | | |
|---|---|---|---|---|
| 6,822,687 B1 * | 11/2004 | Kakiuchi | .............. | G01S 17/894 348/E13.005 |
| 2003/0043287 A1 * | 3/2003 | Kakiuchi | .............. | G01S 7/4811 348/136 |
| 2016/0364015 A1 * | 12/2016 | Send | ...................... | G02B 27/10 |

(Continued)

FOREIGN PATENT DOCUMENTS

| | | |
|---|---|---|
| CN | 104898125 A | 9/2015 |
| DE | 19827125 A1 | 6/1998 |

(Continued)

OTHER PUBLICATIONS

German Office Action dated Oct. 2, 2018 corresponding to application No. 102018101846.0.

*Primary Examiner* — Luke D Ratcliffe
(74) *Attorney, Agent, or Firm* — Nath, Goldberg & Meyer; Jerald L. Meyer (57) ABSTRACT

An optoelectronic sensor for the detection of objects in a monitored region is provided that comprises at least one light transmitter for transmitting a plurality of light beams separate from one another starting from a respective transmission point, a common transmission optics for the transmitted light beams, at least one light receiver for generating a respective received signal from the remitted light beams reflected from the objects and incident at a respective reception point, a common reception optics for the remitted light beams and an evaluated unit for obtaining information on the objects from the received signals. In this connection the transmission points are arranged on a first circular line and/or the reception points are arranged on the second circular line.

18 Claims, 3 Drawing Sheets

(56) References Cited

U.S. PATENT DOCUMENTS

| | | | |
|---|---|---|---|
| 2018/0156917 A1* | 6/2018 | Gogolla | G01S 7/4814 |
| 2019/0179028 A1* | 6/2019 | Pacala | G01S 7/4813 |
| 2021/0255281 A1* | 8/2021 | Pacala | G01S 17/89 |

FOREIGN PATENT DOCUMENTS

| | | |
|---|---|---|
| DE | 10114362 C2 | 3/2001 |
| DE | 19757849 B4 | 12/2004 |
| DE | 102015121839 A1 | 6/2017 |
| EP | 2375266 A1 | 10/2011 |
| EP | 2381268 A1 | 10/2011 |
| EP | 2381272 A1 | 10/2011 |
| EP | 316864 A1 | 5/2017 |
| EP | 3182153 A1 | 6/2017 |
| JP | 5-333152 A | 12/1993 |
| JP | 2003-185421 A | 7/2003 |
| JP | 20073355 A | 1/2007 |
| JP | 2009-276283 A | 11/2009 |
| JP | 2011-226977 A | 11/2011 |
| JP | 2013-539531 A | 10/2013 |
| WO | 03102717 A2 | 12/2003 |

\* cited by examiner

OPTOELECTRONIC SENSOR AND METHOD FOR THE DETECTION OF OBJECTS

The invention relates to an optoelectronic sensor for detecting objects in a monitored region that comprises at least one light transmitter for transmitting a plurality of light beams separated from one another starting from a respective transmission point, a common transmission optics for the transmitted light beams, at least one light receiver for generating a respective received signal from the remitted light beams reflected from the objects and incident at a respective reception point, a common reception optics for the remitted light beams and an evaluation unit for obtaining information on the objects from the received signals. The invention further relates to a method for the detection of objects in a monitored region in which a plurality of light beams separate from one another starting from a respective transmission point are transmitted through a common transmission optics are reflected from the objects and after passage through a reception optics a plurality of remitted light beams are respective incident at a reception point in order to produce a respectively received signal and the received signals are evaluated for obtaining of information on the objects.

Many optoelectronic sensors work on the principle of scanning in which a light beam is transmitted into the monitored region and the light beam reflected from the objects is received again in order to then evaluate the received signal electronically. In this connection the time of flight of light is frequently measured with a known phase method or pulse method in order to determine the distance to a scanned object.

In order to expand the measurement range of a single beam light scanner, the scanning beam can, on the one hand, be moved, as it occurs in a laser scanner. There, a light beam generated by a laser periodically covers the monitored region with the aid of a deflection unit. In addition to the measured distance information an angular position of the object is concluded from the angular position of the deflection unit and in this way the position of an object is detected in the monitored region in two-dimensional polar coordinates.

A different possibility for expanding the measurement range and for obtaining additional distance data consists therein of detecting a plurality of measurement points at the same time with several scanning beams. This can also be combined with a laser scanner that then not only monitors a single monitoring plane, but rather via a plurality of monitoring planes detects a three-dimensional spatial region. In most laser scanners a scanning movement is obtained by a rotating mirror. Specifically on the application of a plurality of scanning beams it is also known in the state of the art to rather let the complete measurement head with light transmitters and light receivers rotate as this is for example described in DE 197 57 849 B4.

In principle a plurality of scanning beams can be achieved by a multiplication of the components of a single beam device. However, this is unnecessarily demanding in effort and cost and is complex. For this reason, attempts are made in the state of the art to use components a plurality of times. For example, in DE 10 2015 121 839 A1 the scanning beams of a plurality of light transmitters are shaped by means of a common transmission optics and are deflected into the desired direction. In this connection, a further problem arises as the transmission optics now also has to image object points in a focused manner with the object points not lying exactly straight on the optical axis. In other words, the transmission optics must also be able to cope with an angle of view of >0°. This in turn collides with the requirement of maintaining the optics simple, preferably of only using a single lens. This is because a single lens has unavoidable imaging errors, with in particular the image field curvature being relevant in this connection.

A possible way out of this is to limit the angle of view to values close to 0° such that the image field curvature remains small. However, in this way only scanning beams lying close to one another can be realized with the same optics. Having regard to a sensible mutual spacing of a few degrees and to an angle of view limited to, for example <5°, a common optics does not allow more than two or three scanning beams. For more scanning beams and a larger measurement region range of for example 30°, however, more optics are required again.

On the other hand, also the possibility exists to dispense with simple optics and to use a multi-lens lens system, whereby the imaging errors are reduced. This is then significantly more expensive and must be adjusted in itself. Frequently, also only a smaller focal ratio is achievable, since a focal ratio of beneath 2 can only be realized in a different manner, with one lens system frequently one only even achieving a focal ratio of approximately 3. This however permits a reception aperture of reduced size and for this reason reduces the range of the device. Typical single lenses in contrast can have a focal ratio of 1.

The EP 3 182 153 A1 suggest to effectively curve the surface having the light transmitters or light receivers. This generates an additional degree of optimization independent of the actual optical elements, however, still requires additional parts or an additional processing.

The DE 101 143 62 C2 discloses a laser scan system. In an embodiment four additional laser transmitters are provided in order to obtain a piece of pre-crash information. These laser transmitters however uses their own optics.

In a laser scanner in accordance with EP 2 381 268 A1 four VCSEL laser diodes are used as light transmitters. However, this is still not a multi-beam system, since the four VCSEL laser diodes only effectively generate one common scanning beam and correspondingly only one single receiver is present. A common transmission optics is also not provided.

For this reason, it is the object of the invention to simplify and to improve a multi-beam system of this kind.

This object is satisfied by an optoelectronic sensor and by a method for the detection of objects in a monitored region in accordance with the respective independent claim. The sensor in accordance with the invention is a multiple scanner that transmits a plurality of light beams from respective transmission points by means of at least one light transmitter. Each transmission point is effectively a light transmitter from which the respectively transmitted light beam emanates, with it initially not necessary being required that physical light transmitters are present at the transmission points. Rather, in a few embodiments, also a physical light transmitter can generate a plurality of transmitted light beams at a plurality of or at all of the transmission points as will be discussed in more detail in the following. The transmitted light beams are furthermore not to be understood as beams in the sense of the beam optics within a large bundle of light, but rather as light bunches separate from one another and thus as individual scanning beams that on being incident at an object in the monitored region correspondingly generate individual light spots spaced apart from one another.

At least one light receiver is able to generate a respective received signal from the light beams remitted from different directions that are reflected at the objects and that are incident at a respective reception point. Similar to the embodiments having the transmission points, the reception points are effectively light receivers without physically having to place a light receiver at each reception point. The received signals generated in this way are evaluated in order to obtain information on the object.

The transmitted light beams run through a common transmission optics that, for example, ensures that the transmitted light beam have a desired beam shape, a clear separation from one another or certain beam directions. The same is true for the remitted light beams and their common reception optics.

The invention is now based on the basic idea of arranging the transmission points on a first circular line and/or the reception points on a second circular line. This, at a first view, in particular having regard to a laser scanner, appears to be paradoxical, as there a one-dimensional arrangement on a simple line would suffice, with which a collection of planes would be scanned by the rotary movement. The circular lines however enable the reduction of the impact of the imaging errors discussed in the foregoing and to practically switch off the image field curvature. It should be noted that a circular line does not have to cover all light beams, rather having regard to a sensor of modular design having a plurality of light beams, a plurality of groups can be formed in a modular manner, with the groups at least partly forming for themselves circular lines from the transmission points respectively from the reception points.

The invention has the advantage that also larger angles of view and in this way spacings of the light beams become possible albeit very simple optics generally without limitations by the image field curvature. For example, image field curvature of ±10° or more having correspondingly more scanning beams or larger angular spacings therebetween are accessible with a high quality with a single lens. In order to cover an even larger angular range of, for example 30°, already very few transmission/reception modules are sufficient. Having regard to like large angles between the light beams significantly smaller transmission and reflection light spots are generated. This reduces the requirements with respect to the alignment accuracy and the light losses, and it enables larger ranges and smaller detectors with higher frequency band widths. In comparison to individual optics a common and in this way larger optics can improve tolerances better, for example deviating divergence angles, respectively performance deviations for temperature-sensitive VCSEL light sources.

The first circular line is preferably centered about the optical middle axis of the transmission optics and/or the second circular line is centered about the optical middle axis of the reception optics. In other words, the optical middle axis of the respective optics run through the center of a circle of the circular line. Then for typical rotationally symmetrical properties of the optics, the light beams respectively experience the same beam forming effects and deflection effects. For this reason, it does not even have to be the aim in accordance with the invention of creating optics with a particularly small image field curvature effect which particularly for individual lenses would almost be physically impossible. Rather the effect of the circular arrangement is that the light beams are subject to the same imaging errors respectively the optics can be optimized specifically for the one relevant angle of view corresponding to the circular line.

The plane of the first circular line preferably lies perpendicular to the optical middle axis of the transmission optics and/or the plane of the second circular line lies perpendicular to the optical middle axis of the reception optics. In principle it would also be plausible to tilt the mentioned plane. Due to the Scheimpflug requirement this should take place both at the transmission side and at the reception side. If one now considers the arrangement of the transmission points respectively the reception points along the optical middle axis then one effectively does not necessarily obtain a circle, but possibly an ellipse. This in principle remains an arrangement on a circular line in the sense of the invention, as the physical positions still lie on a circle, but the optical properties as a whole are less favorable than for a perpendicular arrangement of the plane.

The transition points are preferably uniformly distributed on the first circular line and/or the reception points are uniformly distributed on the second circular line. Such a uniform arrangement in which the transmission points respectively the reception points form a regular n polygon is simpler to handle, in particular in order to obtain like angular spacings between the scanning beams. Further, also an irregular distribution on the circular line remains possible and this in no way excludes the setting of like angular spacings between the scanning beams.

The at least one light transmitter generates preferably three, five or more light beams. Correspondingly, there are three, five or more transmission points, remitted light beams and reception points. Expressed negatively, the mentioned number does not correspond to two or four. Amongst the advantageous numbers larger than five one should still mention six, eight or sixteen as particularly advantageous. It is repeated that the number can relate also to a transmission/reception module of which a plurality can be installed in an optical sensor. The total number of scanning beams then adds up from the sum of the number of the installed modules and in this way further numbers can be construed.

The at least one light transmitter preferably generates four light beams, wherein the transmission points and/or the reception points are not arranged at a square or a rectangle. At this position exactly the number four is meant, this is not a statement to the effect at least four. With the previous paragraph the combined condition can be formulated that preferably the number of light beams and in this way transmission points respectively reception points either does not correspond to four or if it does correspond to four then not into a quadratic or rectangular arrangement.

The sensor preferably has plurality of light transmitters or light sources, in particular one light transmitter per transmission point and/or a plurality of light receivers or light reception elements, in particular a light receiver per reception point. The transmitted light beams are thus at least partly generated, if not all, directly by their own light transmitter at the transmission points and the same is true for the remitted light beams, reception points and light receivers.

The light transmitters and/or the light receivers preferably form a component having a basic surface, in particular a rectangular or quadratic basic surface, wherein the basic surfaces are at least partly rotated with respect to a diameter of the circular line or mutually with respect to one another. Physical light transmitters respectively light receivers do not consist of a point-like emission surface or reception surface, but rather are semiconductor components having an extent going beyond this. This basic surface is typically quadratic or rectangular and then the basic surface of a desired arrangement can stand in the way of the circular line. This in turn can be circumvented by a further rotated arrangement. The basic surfaces can be rotated with respect to one another but also with respect to an outer reference of the circular line, for example a diameter which is oriented with regard to a rotational axis of a laser scanner. The basic surfaces then do not lie horizontally or vertically with respect to a scanning plane, but rotated with respect thereto.

The light transmitter is preferably associated with a beam splitting element in order to split its light into a plurality of transmitted light beams. Thus, a single physical light transmitter is responsible for a plurality of or even all of the transmission points. It is also plausible to split light of a plurality of light transmitters, for example six transmission points of two light transmitters with threefold splitted light beam.

The light transmitter is preferably configured for the purpose of generating a plurality of light beams separated from one another sequentially through a movement of a light beam at a plurality of, in particular all of, the transmission points. Here a movable light transmitter emulates a plurality of light transmitters at different transmission points. The movement can arise in different ways, for example by a mechanical arrangement, a MEMS mirror, an optically phased array or an acousto-optical modulator.

The light receiver is preferably spatially resolved and has a plurality of active regions at the reception points. In this embodiment the same light receiver is responsible for a plurality of or even all of the reception points. For this purpose, the light receiver in particular has a pixel matrix and only that pixel or those pixels at the reception points are used in order to obtain a received signal. The remaining pixels possibly also generate signals that can however be ignored or not read out. It is also plausible to deactivate such pixels completely, for example in a SPAD matrix (Single Photon Avalanche Diode) targetedly to only bias those pixels at the reception points above the break-down voltage.

The light receiver preferably has only one light sensitive element that covers a plurality of or all of the reception points, wherein the light transmitter is configured for a multiplexing during which only one of the transmitted light beams is active or is configured for a coding. Here the light from a plurality of or even all of the reception points is collected in the same light receiver. In this way no differentiation of the remitted light beams is possible for the concerned reception points, rather this is achieved by a transmission side multiplexing or a differentiable beam coding, for example, a pulse coding.

Light transmitters and light receivers preferably form a coaxial arrangement and the transmission optics and the reception optics are combined in a common optics. This results in a particularly compact assembly. The common optics functions in a double role as a transmission and as a reception optics.

The transmission optics and/or the reception optics preferably have a lens. The optics consequently work in a refractive manner, but not for example reflexive or diffractive, which in principle would also be plausible. Even more preferably the transmission optics respectively the reception optics is composed of the one lens. This results in a particularly simple assembly in which the advantages of the invention can be shown significantly. Alternatively, additional optical elements are plausible, for example a so-called landscape lens formed by a lens with an associated aperture, as a system of two lenses or even an imaging optics having a plurality of lenses.

The sensor is preferably configured as a laser scanner and has a movable deflection unit with whose aid the transmitted light beams are periodically guided through the monitored region. As explained in the foregoing, the laser scanner scans the monitored region in a plurality of planes with the movement of the movable deflection unit. The deflection unit is preferably configured in the form of a rotatable scanning unit that practically forms a movable measurement head in which at least the light transmitter including its common transmission optics and possibly also the light receiver and at least parts of the evaluation unit are accommodated.

The evaluation unit is preferably configured for the purpose of determining a distance to the object between transmission of the light beams and reception of the remitted light beams. The sensor thereby becomes distance measuring. Alternatively, merely the presence of an object is determined and for example output as a switching signal.

The method in accordance with the invention can be further developed in a similar manner and in this way has similar advantages. Such advantageous features are described by way of example but not conclusively in the dependent claims attached to the independent claims.

The invention will also be described in detail in the following with regards to further features and advantages by way of example by means of embodiments and with reference to the submitted drawing. The illustrations of the drawing show in:

FIG. 2b a sideview of the arrangement in accordance with FIG. 2a;

FIG. 2c a perspective view of the arrangement in accordance with FIG. 2a;

Figure 1:
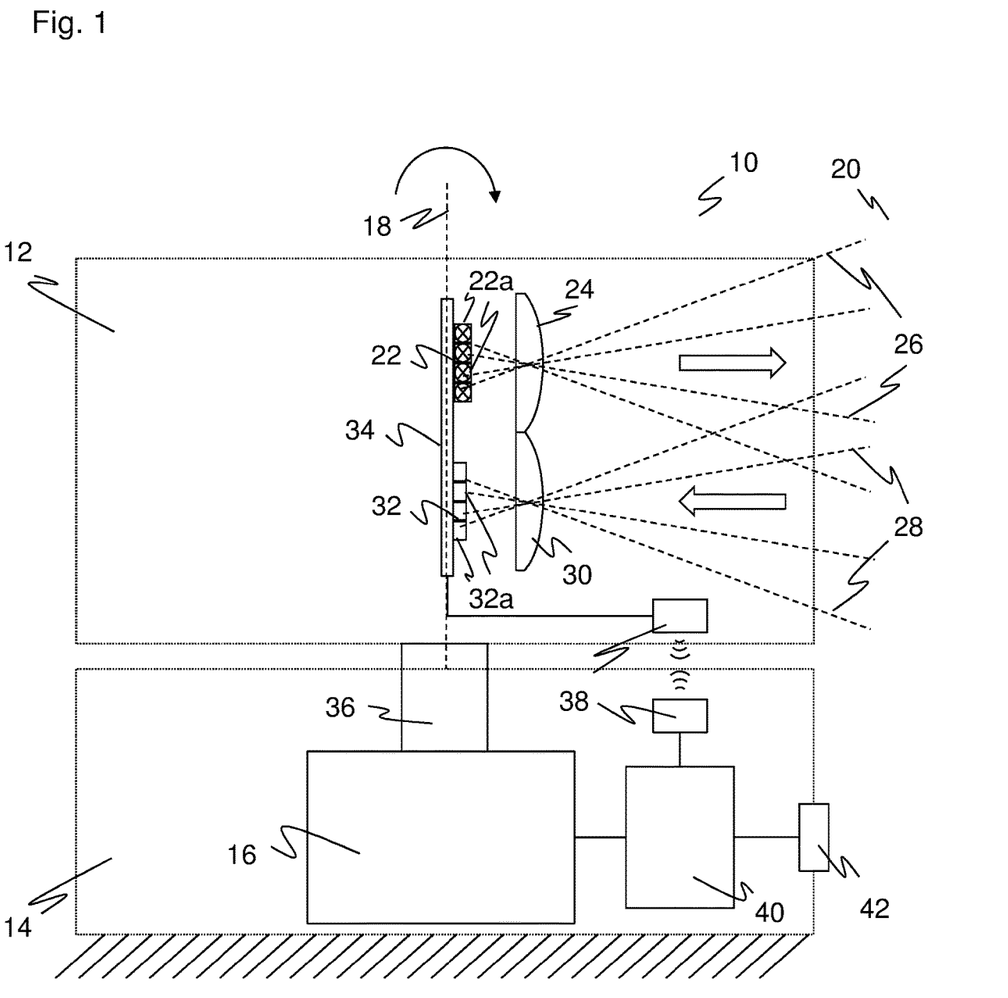
FIG. 1 a sectional illustration of an optical sensor configured as a laser scanner.

FIG. 1 shows a schematic sectional illustration through an optoelectronic sensor 10 in an embodiment as a laser scanner. The sensor 10 comprises in large partitioning a movable scanning unit 12 and a base unit 14. The scanning unit 12 is the optical measuring head, whereas further elements such as a supply, evaluation electronics, connections and the like can be accommodated in the base unit 14. In operation the scanning unit 12 is displaced into a rotating movement about an axis of rotation 18 in order to thus scan a monitored region 20 periodically with the aid of a drive 16 of the base unit 14.

In the scanning unit 12, a light transmitter 22 having a plurality of light sources 22a, for example LEDs or lasers in the form of edge emitters or VCSELs, with the aid of a common transmission optics 24 produce a plurality of light beams 26 with mutual angular spacing that are transmitted into the monitored region 20. If the transmitted light beams 26 are incident at an object in the monitored region 20 then correspondingly remitted light beams 28 return back to the sensor 10. The remitted light beams 28 are guided from a common reception optics 30 to a light receiver 32 having a plurality of light reception elements 32*a* that respectively generate an electric received signal. The light reception elements 32*a* can be separate components or pixels in an integrated matrix arrangement, for example photodiodes, APDs (Avalanche Diodes) or SPADs (Single-Photon Avalanche Diodes).

The four light sources 22*a* and light reception elements 32*a* are illustrated in a simplified manner on top of one another purely by way of example. In accordance with the invention at least one of the group is arranged in a circular figure, respectively on a circular line in reality. This however does not have to relate to the physical light sources 22*a* and light reception elements 32*a*, but rather to the only in this connection effective transmission points coinciding therewith as starting points of the transmission light beams 26 and reception points as end points of the remitted light beams 28. Transmission points, reception points as well as their possible number, arrangement and generation will be described in detail in the following with reference to the general description of the sensor 10 with reference to the FIGS. 2 to 3 in numerous embodiments.

The light transmitters 22 and the light receivers 32 are arranged on a common circuit board 34 in this embodiment that lies on the axis of rotation 18 and is connected to the shaft 36 of the drive 16. This is to be understood only purely by way of example, practically an arbitrary number and arrangement of circuit boards is plausible. Also, the optical basic assembly with a light transmitter 22 and light receiver 23 lying biaxially adjacent to one another is not necessary and can be replaced by a construction shape known from single beam optoelectronic sensors or laser scanners. An example for this is a coaxial arrangement having or not having a beam splitter.

A contactless supply and data interface 38 connects the movable scanning means 12 to the stationary base unit 14. There a control and evaluation unit 40 is present that can at least partly be accommodated also on the circuit board 34 or at a different position in the scanning unit 12. The control and evaluation unit 40 controls the light transmitter 22 and receives the received signals of the light receivers 32 for further evaluation. It moreover controls the drive 16 and receives the signal of a non-shown angular measurement unit generally known from laser scanners which determines the respective angular position of the scanning unit.

For the evaluation the distance to a scanned object is preferably measured with a time of flight of light method known per se. Together with the information on the angular position from the angular measurement unit, two-dimensional polar coordinates of all object points in a scanning plane are made available after each scanning period denoting angle and spacing. The respective scanning plane is likewise known via the identity of the respective remitted light beam 28 and its detection in a light reception element 32*a* such that totally three-dimensional spatial region can be scanned.

In this way the object positions respectively the objects contours are known and can be output via a sensor interface 42. The sensor interface 42 or a further not shown connection vice versa serve as a parameterized interface. The sensor 10 can also be configured as a safety sensor for a use in the safety technology for monitoring a source of danger that is, for example represented by a dangerous machine. In this connection a protective field is monitored that may not be accessed by operating personnel during the operation of the machine. If the sensor 10 recognizes a non-allowed infraction of the protective field, for example a leg of an operating person then this initiates an emergency stop of the machine. Sensors 10 used in the field of safety technology must work particularly reliably and for this reason satisfy high safety requirements, for example the norm EN13849 for machine safety and the device norm EN61496 for contactless working protective device (BWS). In particular, the sensor interface 42 can then be configured as a secure output interface (OSSD, Output Signal Switching Device) in order to output a safety-related cutoff signal on a protective field infraction by an object.

The illustrated sensor 10 is a laser scanner having a rotating measurement head, namely the scanning unit 12. Alternatively, also periodic deflection by means of a rotating mirror or a facet mirror wheel is plausible. For a plurality of transmission light beams 26 this however has the disadvantage that it depends on the respective rotary position, how the plurality of transmitted light beams 26 are incident into the monitoring region 20 as their arrangement rotates through the rotating mirror as is given by known geometric considerations. A further alternative embodiment pivots the scanning unit 12 to and fro rather than the rotary movement or additionally about a second scanning axis perpendicular to the rotating movement in order to also generate a scanning movement in elevation. Furthermore, the scanning movement for generating the scanning plane can also be generated with other known methods, for example MEMS mirrors, optical phased arrays or acousto-optical modulators, in particular having regard to embodiments in which one light source generates a plurality of transmission points.

Also, the embodiment of a laser scanner is purely by way of example. Also, a one-dimensional scanner without periodic movement is plausible which then practically only consists of the stationary scanning unit 12 with corresponding electronics, however, without the base unit 14.

During the rotation of the sensor 10 a surface is respectively scanned for each of the transmission light beams 26. Only for a deflection angle of 0°, this means a horizontal transmission light beam not present in FIG. 1, a plane of the monitored region 20 is scanned in this connection. The remaining transmission light beams scan the jacket surface of a cone that depending on the scanning angle can be formed with a different acuteness. Having regard to a plurality of transmission beams 26 that can be deflected at different angles upwardly and downwardly, a kind of nesting of hourglasses arises totally as a scanning formation. Also, these surfaces are referred to in this context in a simplified manner as scanning plane.

Figure 2A:
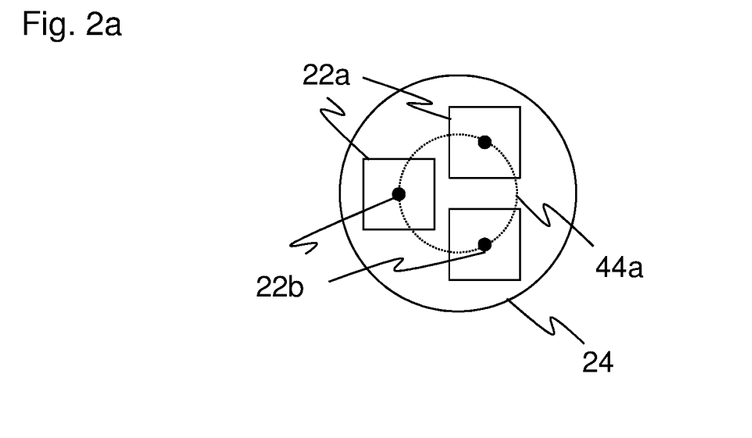
FIG. 2a an exemplary arrangement of a plurality of light transmitters or light receivers on a circular line in a top view.
Figure 2B:
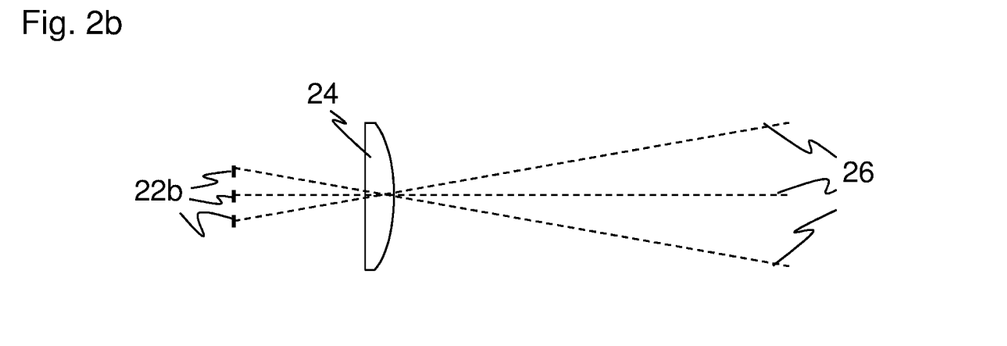
Figure 2C:
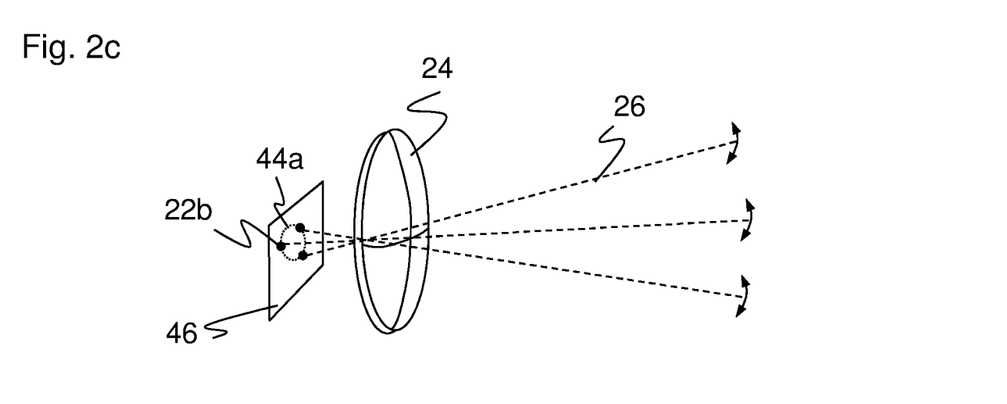

The FIGS. 2*a-c* in a top view, a side view and a perspective view show an exemplary arrangement of transmission points 22*b* on a circular line 44*a*. In this example there are three transmission points 22*b* and in this way three transmission light beams 26. Subsequently, in FIG. 3 also further embodiments with a different number and arrangement are presented. The reference to the transmission side is arbitrary, as a corresponding arrangement is alternatively or accumulatively likewise possible at the reception side. Merely the terms light transmitter 22, light source 22*a*, transmission point 22*b*, transmission optics 24, transmission light beam 26 and emission surface have to be replaced by light receiver 32, light reception element 32*a*, reception point 32*b*, reception optics 30, remitted light beam 26 and light sensitive surface. In order to emphasize this, this exchange of the terminology is carried out with reference to FIG. 3 that relates to the reception side. Following this statement, it is clear that likewise with FIG. 2 could be described with reference to the reception side or that FIG. 3 could be described with reference to the transmission side.

In connection with FIG. 1 the difference between a light source 22a and a light transmission point 22b was already introduced shortly. A transmission point 22b is the starting point of a transmission light beam 26. This can at the same time be the position of a physical light source 22a. On the one hand, however, a light source 22a as a semiconductor component also has a certain basic surface, here a quadratic basic surface that is larger than the emission surface. Moreover, it is possible to generate transmission light beams from a plurality of transmission points 22b from the same physical light source 22a. Examples of this will be given in the following, following the explanations with reference to FIGS. 2 and 3. Corresponding statements are true for reception points 32b.

Preferably, the optical middle axis of the transmission optics 24 intersects the center point of the circular line 44a in the example of FIG. 2. Due to the arrangement of transmission points 22b at the circular line 44a all transmission light beams 26 have the same angle of view. The field image curvature is effectively removed.

It is also advantageous when the plane 46 of the circular line 44a is oriented perpendicular to the optical axis of the transmission optics 24 as shown in FIG. 2c. An inclination of the plane 46 is however not excluded. Then, however, effectively namely from the view of the transmission optics 24, no circular line 44 is possibly realized, but rather an ellipse that depending on the inclination of the plane 46 results in worsened optical properties. In FIG. 2c arrows at the transmission light beams 26 indicate the scanning movement of a laser scanner.

Strictly speaking the transmission points 22b are not mathematical points but rather have a finite extent such only one part and in particular the middle points can be arranged at the circular line 44a. However, the remaining emission surface is still present in direct vicinity such that a considerable advantage by the reduction of the imaging blurriness is achieved by the image field curvature.

The FIGS. 3a-f show diverse, but not conclusive examples for the arrangement of reception points 32b at a circular line 44b. Reference has been made a plurality of times that comparable arrangements are also plausible at the transmission side. At least in the biaxial arrangement in accordance with FIG. 1 the reception points 32 necessarily lie on a different circular line 44b than the circular line 44a of the transmission points 22b.

Figure 3A:
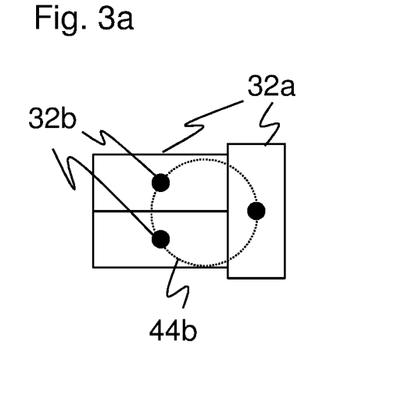
FIG. 3a an exemplary arrangement of three light transmitters or light receivers with a rectangular basic surface.

FIG. 3a is an example having three reception points 32b similar to FIG. 2a, however here with a rectangular basic surface of the light reception elements 32a. By rotating a light reception element 32a with respect to the remaining light reception elements 32a by 90°, a small basic surface and uniform arrangement of the reception points 32b can be achieved.

Figure 3B:
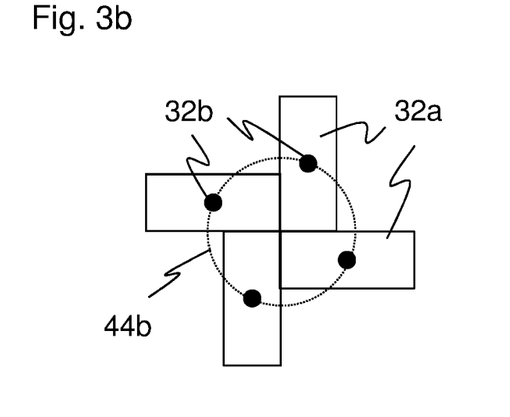
FIG. 3b an exemplary arrangement of four light transmitters or light receivers.

FIG. 3b is an example having four reception points 32b. Again, the light reception elements 32a are rotated by 90°, in this way a compact arrangement is made possible. It is plausible to provide gaps between the light reception elements 32a, for example such that the reception points 32b lie uniformly distributed in the height direction. This enables the equidistantly spaced scanning beams and in a laser scanner, scanning planes.

Figure 3C:
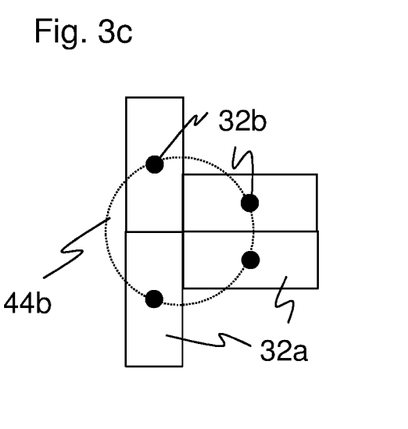
FIG. 3c a different non-rectangular or quadratic arrangement of four light transmitters or light receivers.

FIG. 3c with reference to a further example having four reception points 32b shows that it is possible or even advantageous when one deviates from a quadratic and/or rectangular arrangement of the reception points 32b. In this case, a smaller overall extent is thereby achieved in comparison to the arrangement in accordance with FIG. 3b measured at a circumscribing rectangle or in the horizontal direction.

Figure 3D:
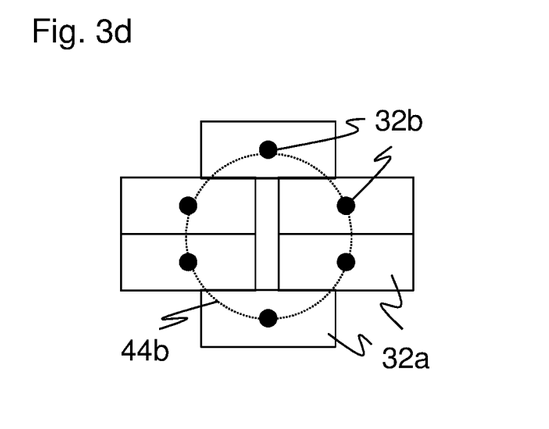
FIG. 3d an exemplary arrangement of six light transmitters or light receivers.
Figure 3E:
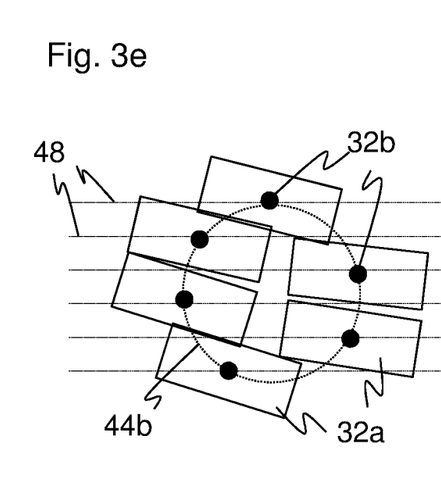
FIG. 3e an arrangement similar to FIG. 3d, but with rotated surfaces.

The FIGS. 3d and 3e are examples with six reception points 32b. In this connection FIG. 3e illustrates a further possible rotation of the components, this means the light reception elements 32a here. In this connection, on the one hand, the overall arrangement with regard to the circular line 44b or their center points respectively, for example, with respect to the vertical diameter. Moreover, also individual light reception elements 32a are rotated with respect to one another so that they find their space and at the same time the reception points 32b are uniformly distributed in the height direction. Horizontally dotted lines 48 indicate the thereby achievable equidistant scanning planes of a laser scanner.

Figure 3F:
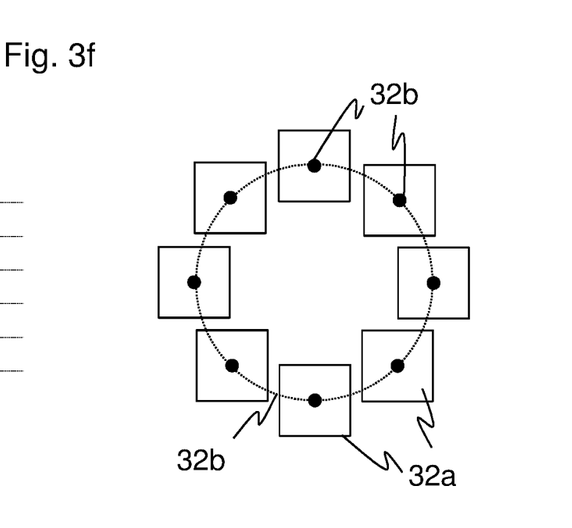
FIG. 3f an arrangement of eight light transmitters or light receivers with quadratic basic surface.

FIG. 3f finally shows an example with eight reception points 32b. Moreover, the basic surfaces here are quadratic in order to emphasize the invention is not limited to a certain basic surface.

From the examples it is clear that the components can be arranged uniformly spaced apart from one another at like spacing at the circular line 44b and/or in a height direction, but do not have to be. Moreover, diverse numbers 3, 4, 5, 6, 7, 8, . . . 16 and more are plausible.

In the embodiment in accordance with FIG. 1 each transmission point 22b is realized by an own light source 22a and each reception point 32b is realized by an own reception element 32a. One can alternatively deviate from this in different ways. The same light source 22a can generate transmission light beams 26 by way of a beam splitting element or the like for a plurality of or even all of the transmission points 22b. The light source 22a can be moved mechanically in order to sequentially generate transmitted light beams 26 for a plurality of or even all of the transmission points 22b. The transmission light beam 26 can also scan the circular line 44a or a part thereof without mechanical movement of the light source 22a, for example by means of MEMS mirrors, optically phased arrays or acousto-optical modulators.

A plurality of reception points 32b can in turn likewise be achieved by separate light reception elements 32a such as pixels or pixel regions of an integrated multiple arrangement of light reception elements 32a. Also, at the reception side a mechanical movement of a light reception element 32a along the circular line 44b or a part thereof or a corresponding deflection of the remitted light beams 26 by means of a movable MEMS mirror or the like is plausible. In a further embodiment, the received light of a plurality of or all of the reception points 32b is guided to a common light reception element. In order to still be able to determine the identity of the respective remitted light beam 28 a multiplexing with sequential activation of the transmission light beams 26 or via a timely coding of the multiple pulse sequence of the transmission beams is possible.

The invention permits all of these embodiments of arrangements on a circular line 44a-b transmission side, reception side or at both sides.

It is particularly advantageous when the invention having regard to a transmission optics 24 respectively a reception optics 30 only consists of a single lens. This makes the optics particularly simple and permits a smaller focal ratio and the in any way present disadvantage of large imaging errors in particular by image field curvature is largely compensated by way of the invention. Nevertheless, a circular arrangement in accordance with the invention is also advantageous for an arrangement of an individual lens with a landscape lens, having a two-fold or multi-lens optics or imaging lens system.

Individual light sources 22a and/or light reception elements 32a including their (SMD) housings can be placed in a circular arrangement on a circuit board. Alternatively, the mere semiconductor chips are packaged in a common housing in a circular arrangement (sub-mounted). In this way circles of smaller diameter or with like diameter having more transmission points 22b respectively reception points 32b become possible and in this way a larger scanning angle or more scanning planes. It is also plausible that the circularly arranged transmitters/receivers sit on a common semiconductor chip. This construction form then approximates to the construction form of the reception imager.

What is claimed is:

1. An optoelectronic sensor for detecting objects in a monitored region, the optoelectronic sensor comprising:
   at least one light transmitter for transmitting a plurality of light beams separated from one another and each starting from a respective individual transmission point located at the at least one light transmitter;
   a common transmission optics for the transmitted light beams;
   at least one light receiver for generating a respective received signal from the remitted light beams reflected from the objects and each being incident at a respective individual reception point located at the at least one light receiver, and
   a common reception optics for the remitted light beams and an evaluation unit for obtaining information on the objects from the received signals,
   wherein the transmission points are arranged on a first circular line and/or the reception points are arranged on a second circular line,
   wherein the at least one light transmitter, the common transmission optics, the at least one light receiver, and the common reception optics rotate together about a common axis of rotation to periodically scan the monitored region, and
   wherein at least one of the at least one light transmitter and the at least one light receiver form components having basic surfaces, wherein the basic surfaces are at least partly rotated with respect to one another in a plane defined by a corresponding one of the first and/or second circular lines.

2. The optoelectronic sensor in accordance with claim 1, wherein the first circular line is centered about the optical middle axis of the transmission optics and/or the second circular line is centered about the optical middle axis of the reception optics.

3. The optoelectronic sensor in accordance with claim 1, wherein the plane of the first circular line lies perpendicular to the optical middle axis of the transmission optics and/or the plane of the second circular line lies perpendicular to the optical middle axis of the reception optics.

4. The optoelectronic sensor in accordance with claim 1, wherein the transmission points are uniformly distributed on the first circular line and/or the reception points are uniformly distributed on the second circular line.

5. The optoelectronic sensor in accordance with claim 1, wherein the at least one light transmitter generates three, five or more light beams.

6. The optoelectronic sensor in accordance with claim 1, wherein the at least one light transmitter creates four light beams and the transmission points and/or the reception points are not arranged at a square or a rectangle.

7. The optoelectronic sensor in accordance with claim 1, further comprising at least one of a plurality of light transmitters and a plurality of light receivers.

8. The optoelectronic sensor in accordance with claim 7, further comprising at least one of a light transmitter per transmission point and a light receiver per reception point.

9. The optoelectronic sensor in accordance with claim 1, wherein the basic surface is one of a rectangular basic surface and a quadratic basic surface.

10. The optoelectronic sensor in accordance with claim 1, wherein a beam splitting element is associated with the light transmitter in order to split its light into a plurality of transmitted light beams.

11. The optoelectronic sensor in accordance with claim 1, wherein the light transmitter is configured to sequentially generate a plurality of light beams separate from one another by moving a light beam at a plurality of transmission points.

12. The optoelectronic sensor in accordance with claim 1, wherein the light receiver is spatially resolved and has a plurality of active regions at the reception points.

13. The optoelectronic sensor in accordance with claim 1, wherein the light receiver only has one light sensitive element that covers a plurality of or all of the reception points, wherein the light transmitter is configured for a multiplexing in which only one of the transmitted light beams is active or is configured for a coding.

14. The optoelectronic sensor in accordance with claim 1, wherein the light transmitter and the light receiver form a coaxial arrangement and the transmission optics and the reception optics are combined in a common optics.

15. The optoelectronic sensor in accordance with claim 1, wherein at least one of the transmission optics and the reception optics has a lens.

16. The optoelectronic sensor in accordance with claim 1, wherein the evaluation unit is configured for the purpose of determining a spacing of the object from a time of flight of light between transmitting the light beams and receiving the remitted light beams.

17. A method for detecting objects in a monitored region, comprising the steps of:
   transmitting a plurality of light beams through a common transmission optics, wherein each of the light beams is separate from other ones of the light beams, and wherein each of the light beams starts from a respective individual transmission point located at at least one light transmitter;
   reflecting the plurality of light beams from the objects;
   following passage through a reception optics, a plurality of remitted light beams arriving incident at respective individual reception points located at at least one light receiver in order to produce respectively received signals; and
   evaluating the received signals for obtaining of information on the objects,
   wherein the transmission points are arranged on a first circular line and/or the reception points are arranged on a second circular line,
   wherein the transmission points, the common transmission optics, the reception points, and the common reception optics rotate together about a common axis of rotation to periodically scan the monitored region, and wherein at least one of the at least one light transmitter and the at least one light receiver form components having basic surfaces, wherein the basic surfaces are at least partly rotated with respect to one another in a plane defined by a corresponding one of the first and/or second circular lines.

18. An optoelectronic sensor for detecting objects in a monitored region, the optoelectronic sensor comprising:
- a plurality of light transmitters for transmitting a plurality of light beams separated from one another and starting from respective individual transmission points respectively located at the plurality of light transmitters;
- a common transmission optics for the transmitted light beams;
- a plurality of light receivers for generating a respective received signal from the remitted light beams reflected from the objects and incident at respective individual reception points respectively located at the plurality of light receivers, and
- a common reception optics for the remitted light beams and an evaluation unit for obtaining information on the objects from the received signals,
- wherein respective transmission points of the plurality of light transmitters are arranged on a first circular line and/or respective reception points of the plurality of light receivers are arranged on a second circular line,
- wherein at least one of the light transmitters and the light receivers form components having basic surfaces, wherein the basic surfaces are at least partly rotated with respect to one another in a plane defined by the corresponding one of the first and/or second circular lines, and
- wherein at least one of the plurality of light transmitters and the plurality of light receivers form components having basic surfaces, wherein the basic surfaces are at least partly rotated with respect to one another in a plane defined by a corresponding one of the first and/or second circular lines.

* * * * *